(12) United States Patent
Branson et al.

(10) Patent No.: US 8,478,874 B2
(45) Date of Patent: Jul. 2, 2013

(54) SYSTEM AND METHOD FOR COMPOSITION OF STREAM PROCESSING SERVICE ENVIRONMENTS

(75) Inventors: Michael John Branson, Rochester, MN (US); Frederick Douglis, Basking Ridge, NJ (US); Parijat Dube, Yorktown Heights, NY (US); Zachary A. Garbow, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1415 days.

(21) Appl. No.: 11/971,327

(22) Filed: Jan. 9, 2008

(65) Prior Publication Data

US 2009/0178048 A1 Jul. 9, 2009

(51) Int. Cl.
*G06F 15/173* (2006.01)
(52) U.S. Cl.
USPC ............ 709/226; 709/224; 709/202; 709/203

(58) Field of Classification Search
USPC .................................. 709/226, 224, 202, 203
See application file for complete search history.

(56) References Cited

U.S. PATENT DOCUMENTS

| 2006/0161884 A1* | 7/2006 | Lubrecht et al. ............... 717/104 |
| 2009/0125359 A1* | 5/2009 | Knapic et al. ..................... 705/8 |
| 2011/0002332 A1* | 1/2011 | Lake et al. ..................... 370/389 |

* cited by examiner

*Primary Examiner* — Lan-Dai T Truong
(74) *Attorney, Agent, or Firm* — Tutunjian & Bitetto, P.C.; William Stock

(57) ABSTRACT

A system and method for composing a stream servicing environment which considers all stakeholders includes identifying service component requirements needed for processing a data stream, and determining available service elements for processing the stream. Feasible service environments are constructed based upon the available service elements and the service component requirements. Efficiency measures are computed for each feasible service environment considering all stakeholders. A best service environment is determined based upon the efficiency measures.

20 Claims, 2 Drawing Sheets

SYSTEM AND METHOD FOR COMPOSITION OF STREAM PROCESSING SERVICE ENVIRONMENTS

GOVERNMENT RIGHTS

This invention was made with Government support under Contract No.: H98230-07-0383 awarded by the U.S. Department of Defense (DOD). The Government has certain rights in this invention.

BACKGROUND

1. Technical Field

The present invention relates to data stream processing and more particularly to systems and method for solving the problem of stream processing systems environment (SPSE) composition to provide stream processing services in an efficient way.

2. Description of the Related Art

Systems for processing streams of data utilize continuous streams of data as inputs, process the data in accordance with prescribed processes and produce ongoing results. Examples of stream processing systems may include System S from IBM™; StreamBase™ from StreamBase Systems™, Inc.; and Borealis™ from MIT and Brown University. In such a system, applications are composed of independent processing elements that operate on streams of data objects by filtering, combining, transforming, and otherwise analyzing the data. These operations can take the form of database operations such as merging streams and selecting tuples that match specific criteria, or they can be more general application-specific logic.

A stream processing system (SPS) can be owned, operated, and used for the benefit of a single entity, such as a corporation or government organization. The SPS can also be owned and operated as a service, in which one organization operates the system for the benefit of other organizations that pay for the use of the stream processing system.

A service provider can be a single entity owning all the components of the SPS (infrastructure, analytics, data sources), or the service provider can represent a collection of different entities owning different components of the SPS. We refer to these entities as service-component providers (SCPs). The infrastructure includes all the hardware, software and networking needed for the service. Further, each of the components may be collectively owned by different providers.

A stream processing service environment (SPSE) can be visualized as a composition of different service-components possibly owned by a same or different SCPs. These SCPs and a customer (who receives the service) are collectively referred to as stakeholders.

The service elements of a stream processing service include service components, the SCPs that own the service components and the customer. Service components may include data sources, analytics, and infrastructure. SCPs may include data source providers, analytics providers, and physical infrastructure providers. A customer is a service subscriber.

Heterogeneity of ownership of service components provides a challenge in coming up with an efficient composition of different SCPs to provide stream processing service to customers. The problem is further aggravated as different SCPs have different and invariably conflicting interests in being part of the composition. Customer interests can also be taken into account during service composition. The difficulty then is not to come up with a SPSE that maximizes profit of a single SCP but a SPSE that is universally acceptable to all the stakeholders, and such a SPSE should balance the interests of different stakeholders.

SUMMARY

A system and method for composing a stream servicing environment, which considers all stakeholders, includes identifying service component requirements needed for processing a data stream, and determining available service elements for processing the stream. Feasible service environments are constructed based upon the available service elements and the service component requirements. Efficiency measures are computed for each feasible service environment considering all stakeholders. A best service environment is determined based upon the efficiency measures.

A system/method for composing a stream servicing environment which considers all stakeholders includes identifying service component requirements needed for processing a data stream including attributes of service components and service component providers, determining available service elements for processing the stream, including potential service components and components providers available in a market that match the service component requirements, constructing feasible service environments based upon the available service elements and the service component requirements including combining the service elements in different combinations under different operational and business level constraints, computing efficiency measures for each feasible service environment considering all stakeholders, determining a best service environment based upon the efficiency measures by satisfying an objective, and composing a service environment is accordance with a determined best service environment.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
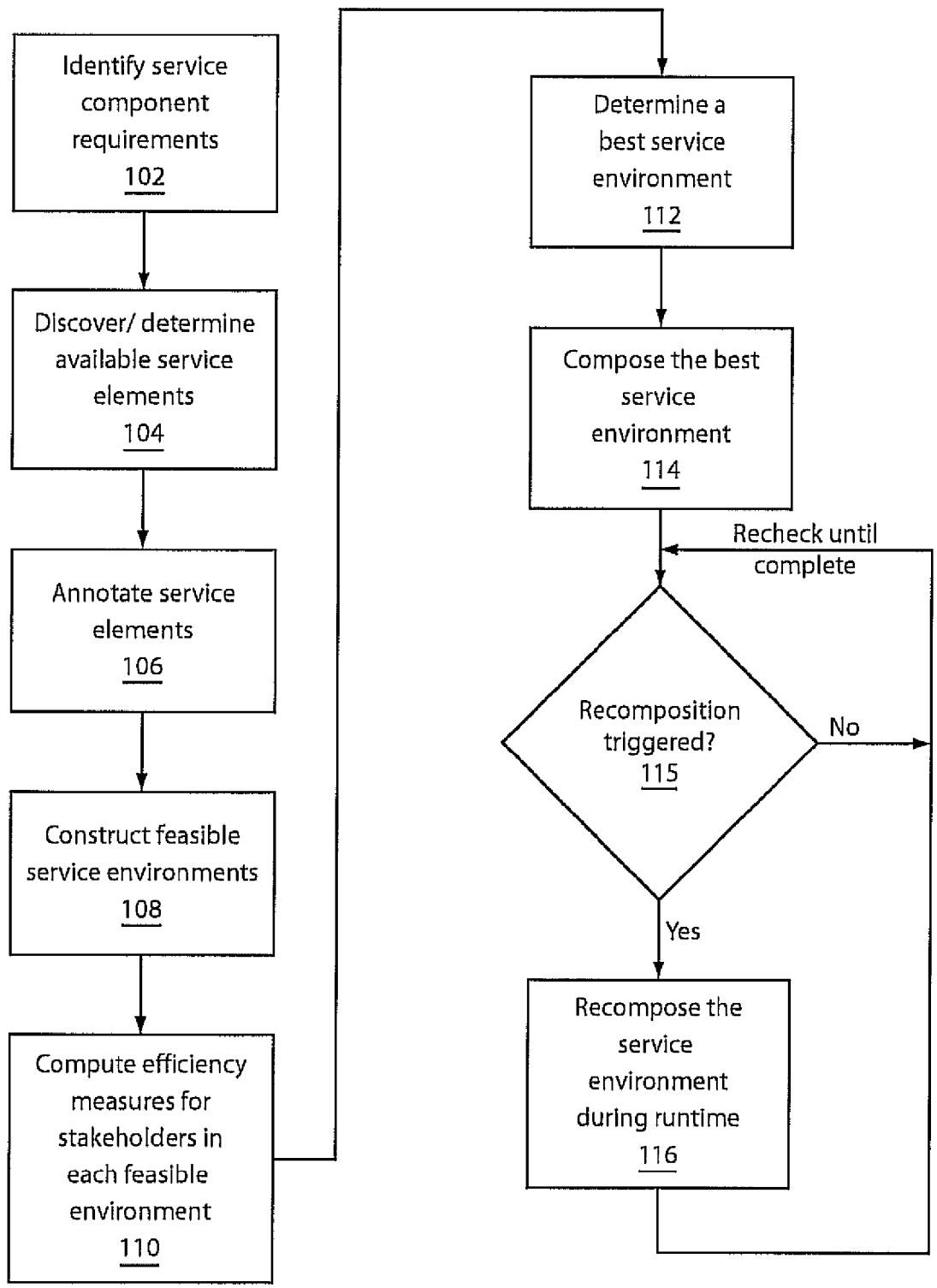
FIG. 1 is a block/flow diagram showing a system/method for composing a stream servicing environment which considers all stakeholders in accordance with the present principles.

Present embodiments solve the problem of stream processing service environment (SPSE) composition to provide stream processing services in an efficient way. In one embodiment, a method and a system are provided for composition of SPSEs under various operational and business level constraints while balancing the interests of different stakeholders. The interest of a stakeholder may be a function of quality indicators of service components, such as, e.g., performance, cost, reliability, availability, etc. or of business objectives, such as, e.g., security, etc. Apart from static composition of service environments prior to service execution, embodiments in accordance with the present principles also support service environment re-composition during lifetime of service.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a block/flow diagram for a system/method for SPSE composition in response to a service request are illustratively shown. In block 102, service component requirements identification is performed to identify service-component requirements for a service. The service-component requirements preferably result in a meta-data representation of attributes of service-components and service-component providers needed for the service. For example, data-source attributes may include physical location, type of data, granularity of data, etc.; analytics attributes may include algorithm type, scalability, complexity, accuracy of results, etc.; provider attributes may include security and privacy considerations, price structure, regulatory structure (private or public sector), bandwidth, performance, etc.

In block 104, service elements discovery is performed. This is to identify potential elements (components and component providers) from a market matching the service-component requirements from block 102. In other words, a determination of what service elements are available is performed which will be employed in later steps for optimization.

In block 106, service elements annotation is provided. This includes labeling performance and cost identifiers to potential candidates for service elements. Service elements may include, for example, service components and their respective SCPs. The identifiers are preferably in the form of <attribute, attribute-value> pairs where the set of attributes include but is not limited to the service-component requirements identified in the service elements discovery phase (block 104). The attributes associated with service components (infrastructure, data sources and analytics) may include: cost, importance level (for query execution), reliability, security, availability, etc. The identifiers associated with SCPs may include: cost, performance, past business experience, reliability, technical and business constraints, etc.

In block 108, feasible service environment construction is performed. This involves constructing feasible service environments using different combinations of service elements from the available set under different operational and business level constraints. This may be performed automatically using a program or manually. Different combinations may be tested or provided depending on applications requirements or constraints.

In block 110, a measure of efficiency for feasible service environments is computed. Each stakeholder associates a measure of efficiency with each feasible service environment. The measure of efficiency is a quantitative metric for the "utility" that the stakeholder derives from the particular service environment. Since the stakeholders' interests are often conflicting, each feasible service environment has a different number for the measure of efficiency for different stakeholders involved in the service environment composition process. The measure of efficiency can be characterized using utility functions from microeconomic theory. Each stakeholder may have its own measure and the measure can be weighted in accordance with each stakeholder and their application.

In block 112, a best service environment within constraints is determined. Given the set of feasible service environments with their associated measure of efficiency, the next step is to identify the service environment that satisfies some objective. This step may be formulated, e.g., as an optimization problem or as a game-theoretic problem. The optimization formulation may include maximizing a (weighted) sum of different stakeholder utility values. For example, an objective function may be determined and its derivative set to zero or a maximum value of a utility measure may be determined in accordance with predetermined criteria. In the game theoretic formulation, finding an equilibrium service environment when each stakeholder wants to maximize their individual utility (e.g., competitive-equilibrium, Nash equilibrium); find efficient coalitions between stakeholders (e.g., co-operative games); and the like. The constraints may include operational-level requirements, business objectives or any other useful constraint.

In block 114, a composition of a service environment is provided based on the results of block 112. The SPSE composition can be handled by a separate entity providing the composition services or it can be owned by some component provider. For example, let A be a company owing a stream processing infrastructure (like System S) including both the physical infrastructure (hardware, software, networking) plus the logical infrastructure (analytics). A does not own the data sources to provide data feeds. In response to a stream processing service request from a customer, A executes the steps outlined earlier for identification of data-sources and data-sources components (block 102-104) and then uses this information together with the attributes of the components owned by itself to come up with best SPSE using blocks 108-114, which maximizes some objective function. This is an example where the SPSE composition is handled by A, the provider owning the stream processing infrastructure.

SPSE composition can be provided per service request, or SPSE composition can be provided once for the duration of a service contract. In the case for the duration of a service request, the same service environment can handle multiple service requests from the customer during the duration of the contract. The constraints for SPSE composition may be different in each case.

In block 115, a determination is made as to whether recomposition is needed. This may include checking efficiency measures or other criteria to determine if satisfactory performance is being achieved. In block 116, service environment re-composition is provided if needed. The present embodiments permit an SPSE to re-compose the service environment dynamically during run-time of service. This involves monitoring the service elements which are part of the service environments during the duration of service to identify violations in the measured value of performance attributes. These violations may trigger re-composition of the service environments.

The re-composition may also be triggered for other reasons. For example, changes in the cost of service elements, expiration or changes in software licensing terms, loss of service component during run-time (due to connectivity issues etc.), availability of new service elements with better performance and cost identifiers in the market, etc. may all be cause for triggering re-composition. Re-composition may include the same or similar steps as set for composition as described above. The check for recomposition may be checked intermittently or constantly monitored for changes.

Figure 2:
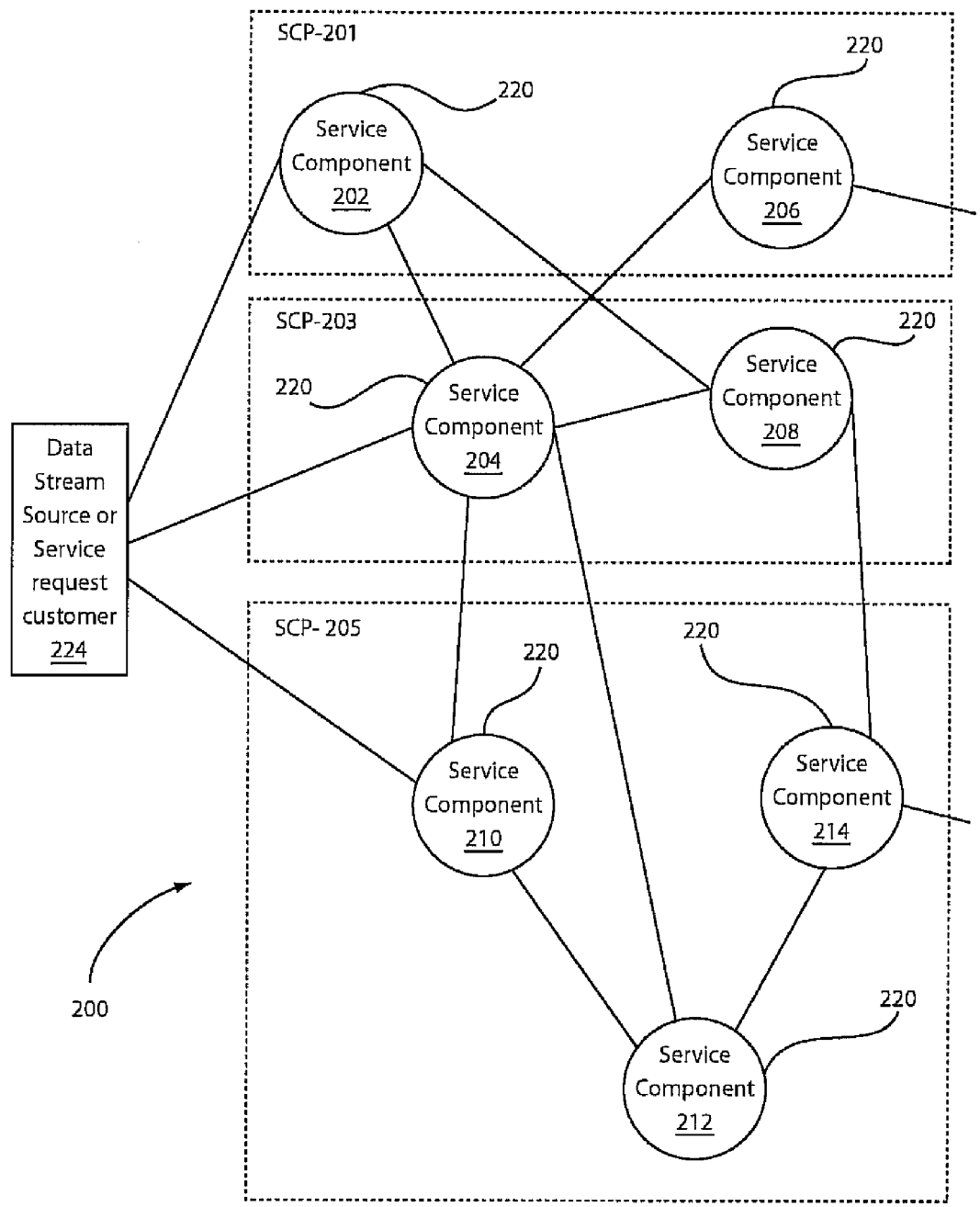
FIG. 2 is a diagram showing a distributed network employed to compose a servicing environment for use in accordance with the present principles.

Referring to FIG. 2, a network is shown on which a system for evaluating and configuring stream processing service environments is illustratively described. A data stream source 224 will be employed to output a data stream over a network. The data stream source 224 may output a service request to process a data stream. A stream processing system (SPS) may include one or more service components labeled generally with numeral 220. A SPS may be owned, operated, and used for the benefit of a single entity, such as a corporation or government organization, or may be owned and operated as a service, in which one organization operates the system for the benefit of other organizations that pay for the use of the stream processing system.

A service provider can be a single entity owning all the components of the SPS (infrastructure, analytics, data sources), or the service provider can represent a collection of different entities owning different components of the SPS. These entities may be referred to as service-component providers (SCPs). In the present example, three SCPs 201, 203 and 205 are depicted. Each SCP 201, 203 and 205 are individually owned by a different service provider. The infrastructure includes all the hardware, software and networking needed for the service. Further, each of the components 220 may be collectively owned by different providers.

A stream processing service environment (SPSE) 200 may include a composition of different service-components possibly owned by a same or different SCPs. The SPSE 200 may be the entire system of FIG. 2 or any portion that may be used to perform a given service. The components 220 may be selected as needed, and may be rented leased or otherwise contracted with to supply the desired service. These SCPs (201, 203, 205) and a customer (224) (who receives the service) are collectively referred to as stakeholders.

The service elements of a stream processing service include service components 220, the SCPs 201, 203 and 205 that own the service components 220 and the customer 224. Service components 220 may include data sources, analytics, and infrastructure. SCPs 201, 203, 205 may include data source providers, analytics providers, and physical infrastructure providers. A customer 224 is a service subscriber.

The ownership of service components 220 provides a challenge in coming up with an efficient composition of different SCPs 201, 203, 205 to provide stream processing service to customers 224. Different SCPs 201, 203, 205 have different and invariably conflicting interests in being part of the composition of the SPSE 200. In FIG. 2, one feasible environment may include, e.g., the system components 202, 204, 208 and 206. In this example, since the services needed are provided by service components of different SCPs (201 and 203) the interests of each SCP 201, 203 and the customer 224 need to be taken into account during service composition in accordance with the present principles.

The SPSE 200 should balance the interests of the different stakeholders. This is performed in accordance with the method described with reference to FIG. 1. The method of FIG. 1 may be executed by any one of the service components 220, the customer 224, an external computer or may include any combination of these in a distributed environment.

To compose a service environment that considers the interests of all stakeholders, the requirements of the service components 220 and the customer 224 are identified. All available services available for the service components are considered and annotated. Then, feasible service environments are considered.

For example, one feasible service environment may include a path from source 224 to service components 202, 204, 212, and 214; another may include service components 202, 204, 210, 212, 214; another may include 202, 204, 208 and 206. For each path or each environment, efficiency measures are computed to determine the most suitable service environment for a given application or service request. A best service environment is then determined for the service request. During processing a re-composition of the environment may be performed to reevaluate and configure the service environment based on dynamic runtime conditions or static changes to the service components, constraints or requirements.

Having described preferred embodiments of a system and method for composition of stream processing service environments (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for composing a stream servicing environment which considers all stakeholders, comprising:
    identifying service component requirements needed for processing a data stream;
    determining available service elements for processing the stream;
    constructing feasible service environments based upon the available service elements and the service component requirements;
    computing efficiency measures for each feasible service environment considering all stakeholders; and determining a best service environment based upon the efficiency measures.

2. The method as recited in claim 1, further comprising: composing a service environment is accordance with a determined best service environment.

3. The method as recited in claim 2, further comprising: recomposing the service environment during execution in response to a change.

4. The method as recited in claim 1, wherein identifying service component requirements includes representing attributes of service components and service component providers.

5. The method as recited in claim 1, wherein the attributes include one or more of data source attributes, analytics attributes and provider attributes.

6. The method as recited in claim 1, wherein determining available service elements includes identifying potential service components and components providers available in the market that match the service component requirements.

7. The method as recited in claim 1, wherein constructing feasible service environments includes combining the service elements in different combinations under different operational and business level constraints.

8. The method as recited in claim 1, wherein computing efficiency measures for each feasible service environment considering all stakeholders includes associating an efficiency measure for each stakeholder for each feasible environment.

9. The method as recited in claim 1, wherein determining a best service environment based upon the efficiency measures includes satisfying an objective to determine the best service environment.

10. The method as recited in claim 9, wherein satisfying the objective includes employing at least one of an optimization formulation and a game theory formulation in accordance with constraints.

11. A non-transitory computer readable storage medium comprising a computer readable program for composing a stream processing service environment which considers all stakeholders, wherein the computer readable program when executed on a computer causes the computer to perform the steps of:
identifying service component requirements needed for processing a data stream;
determining available service elements for processing the stream;
constructing feasible service environments based upon the available service elements and the service component requirements;
computing efficiency measures for each feasible service environment considering all stakeholders; and
determining a best service environment based upon the efficiency measures.

12. The non-transitory computer readable storage medium as recited in claim 11, further comprising: composing a service environment is accordance with a determined best service environment.

13. The non-transitory computer readable storage medium as recited in claim 12, further comprising: recomposing the service environment during execution in response to a change.

14. The non-transitory computer readable storage medium as recited in claim 11, wherein identifying service component requirements includes representing attributes of service components and service component providers, wherein the attributes include one or more of data source attributes, analytics attributes and provider attributes.

15. The non-transitory computer readable storage medium as recited in claim 11, wherein determining available service elements includes identifying potential service components and components providers available in the market that match the service component requirements.

16. The non-transitory computer readable storage medium as recited in claim 11, wherein constructing feasible service environments includes combining the service elements in different combinations under different operational and business level constraints.

17. The non-transitory computer readable storage medium as recited in claim 11, wherein computing efficiency measures for each feasible service environment considering all stakeholders includes associating an efficiency measure for each stakeholder for each feasible environment.

18. The non-transitory computer readable storage medium as recited in claim 11, wherein determining a best service environment based upon the efficiency measures includes satisfying an objective to determine the best service environment.

19. The non-transitory computer readable storage medium as recited in claim 18, wherein satisfying the objective includes employing at least one of an optimization formulation and a game theory formulation to satisfy the object in accordance with constraints.

20. A method for composing a stream servicing environment which considers all stakeholders, comprising:
identifying service component requirements needed for processing a data stream including attributes of service components and service component providers;
determining available service elements for processing the stream, including potential service components and components providers available in a market that match the service component requirements;
constructing feasible service environments based upon the available service elements and the service component requirements including combining the service elements in different combinations under different operational and business level constraints;
computing efficiency measures for each feasible service environment considering all stakeholders;
determining a best service environment based upon the efficiency measures by satisfying an objective; and
composing a service environment is accordance with a determined best service environment.

* * * * *